J. WOOLDRIDGE.
COTTON GIN.
APPLICATION FILED DEC. 17, 1918.
1,426,437.
Patented Aug. 22, 1922.
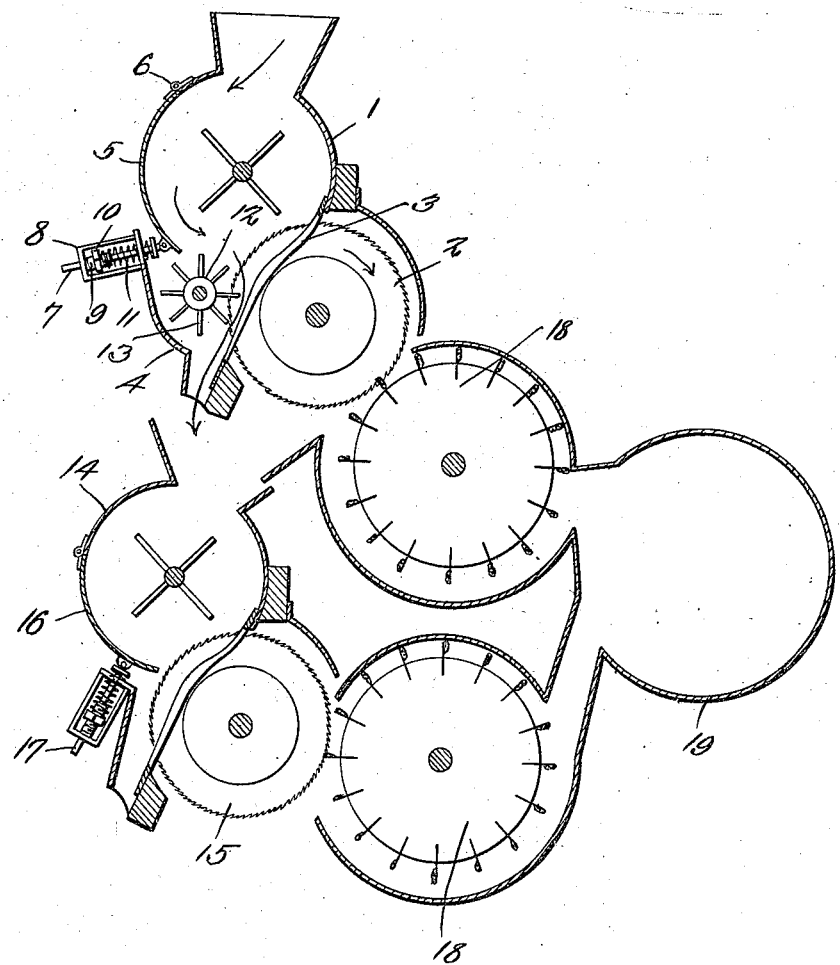

UNITED STATES PATENT OFFICE.

JOHN WOOLDRIDGE, OF TEMPLE, TEXAS, ASSIGNOR OF ONE-HALF TO MARCO MARKS, OF CRAWFORD, TEXAS.

COTTON GIN.

1,426,437. Specification of Letters Patent. Patented Aug. 22, 1922.

Application filed December 17, 1918. Serial No. 267,108.

*To all whom it may concern:*

Be it known that I, JOHN WOOLDRIDGE, a citizen of the United States, residing at Temple, in the county of Bell and State of Texas, have invented a new and useful Cotton Gin, of which the following is a specification.

This invention relates to cotton gins of the double type wherein seeds, after being acted on by one set of saws, are delivered, with the adhering lint, to another set of saws where practically all remaining lint is removed. In gins of this character effective operation has often been impossible because the seeds and lint have clung to the first set of saws too long and seeds and lint have not been supplied in sufficient quantities and with desired regularity to the second saws. Furthermore whole locks of cotton have been discharged from the first set of saws with the seeds to the saws of the second set.

One of the objects of the present invention is to provide means whereby the seeds are cleared from the saws automatically and all of the cotton in each roll box is fed against the saw teeth, thereby preventing the escape of locks of cotton with the seeds.

With the foregoing and other objects in view the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawing, which is a vertical section through the improved gin, the preferred form of the invention has been shown.

Referring to the figures by characters of reference, 1 designates the upper roll box of the gin under which the saws 2 are arranged as ordinarily. The ribs 3 incline downwardly to a delivery hopper 4 and the front board 5 of the roll box is hingedly mounted at its upper end, as shown at 6 while its lower end projects into the upper portion of said hopper where it is connected to a rod 7. This rod is slidably mounted in a guide 8 having a tubular stem 9 on which an adjusting nut 10 is mounted. A spring 11 is mounted on the rod 7 and bears at one end against the nut 10 so as to press the board 5 yieldingly toward the saws 2. Within the hopper 4 is journaled a roll 12 having radial fingers 13 projecting therefrom and between the saws 2.

The hopper 4 discharges into the lower roll box 14 of the lower saws 15 and this roll box is provided with a hinged front board normally pressed inwardly toward the saws by a spring controlled stem 17 similar to the stem 7 hereinbefore described. Doffing brushes 18 are provided for the two sets of saws and operate to deliver cotton to the flue 19.

When cotton is supplied to the box 1 the board 5 will shift outwardly under the pressure of the cotton roll thereagainst and will, at the same time, press the roll against the saws so that locks of cotton cannot escape past the saws and into the hopper 4. The pressure of the cotton on the fingers 13 will cause said fingers to move between the saws and thus clear the cotton and seeds from the saw teeth and insure the uniform feed of material through hopper 4 to the lower roll box. Here the board 16 also acts to press the material against the saws 15 so that practically all lint is removed from the seeds. Thus the value of the product of one ginning operation is greatly increased because loss of lint is reduced to the minimum.

What is claimed is:—

In a gin, a roll box having a downwardly curved upwardly and outwardly opening hinged front board, a hopper arranged below said box into the upper end of which the free end of said board projects, ribs constituting one wall of said hopper, gin saws extending between said ribs into said hopper and into said roll box, a rotatable roll in said hopper having fingers extending between the saws and adjacent the ribs, and adjustable, yieldable means slidably mounted in one wall of said hopper and pivotally engaged with the front board for holding said board yieldably pressed inward to position over the roll.

In testimony that I claim the foregoing as my own, I have hereto affixed my signature in the presence of two witnesses.

JOHN WOOLDRIDGE.

Witnesses:
J. P. SPIRES,
NICK WOODWARD.